No. 780,541. PATENTED JAN. 24, 1905.
R. P. TOMASSEK & I. H. SAMPERS.
CAR WHEEL.
APPLICATION FILED DEC. 16, 1903.
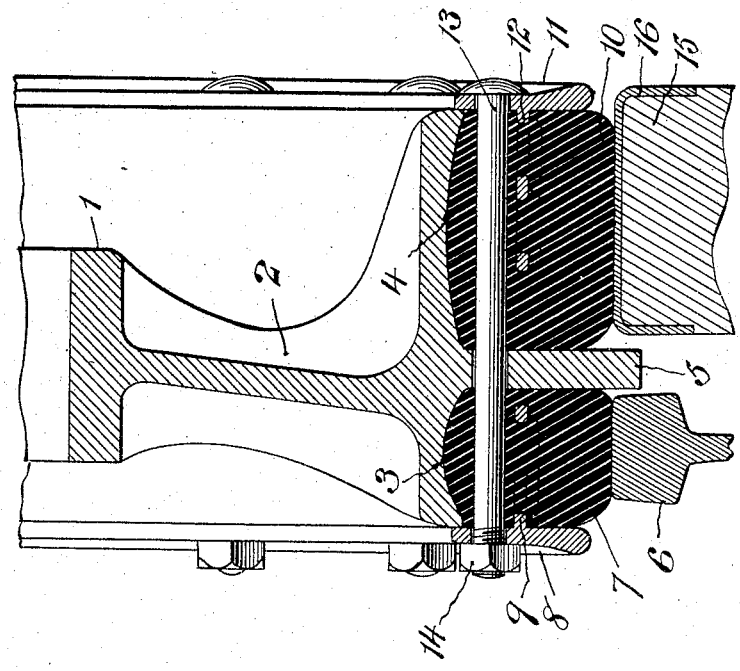
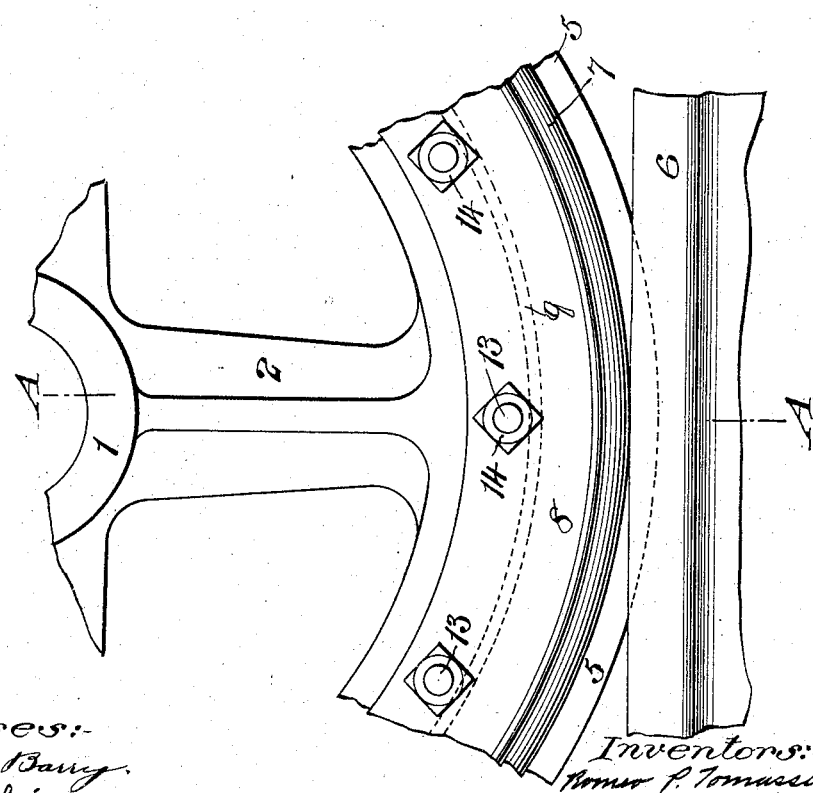

No. 780,541. Patented January 24, 1905.

UNITED STATES PATENT OFFICE.

ROMEO P. TOMASSEK AND ISIDORE H. SAMPERS, OF NEW YORK, N. Y., ASSIGNORS TO THE NOISELESS CAR AND CAR WHEEL COMPANY, OF NEW YORK, N. Y., A CORPORATION OF NEW YORK.

CAR-WHEEL.

SPECIFICATION forming part of Letters Patent No. 780,541, dated January 24, 1905.

Application filed December 16, 1903. Serial No. 185,361.

*To all whom it may concern:*

Be it known that we, ROMEO P. TOMASSEK and ISIDORE H. SAMPERS, citizens of the United States, and residents of the borough of Manhattan, in the city and State of New York, have invented a new and useful Car-Wheel, of which the following is a specification.

Our invention relates to a car-wheel, with the object in view of providing a wheel of this character with an elastic tire, and so materially reducing the noise, wear, and tear in operating the wheel.

A practical embodiment of our invention is represented in the accompanying drawings, in which—

Figure 1 is a view of a portion of the wheel in side elevation, showing it in position with respect to the rail; and Fig. 2 is a transverse section in the plane of the line A A of Fig. 1.

Our invention is directed particularly to the construction of a wheel with an extended elastic bearing-surface for supporting heavy cars without disturbing the present arrangement of the railway-rails; and it consists in a car-wheel provided with an elastic tire on the inner side of the guard-flange which is relied upon to hold the wheel on the railway-rail.

The hub of the wheel is denoted by 1, and the spokes which connect the hub with the rim by 2.

The rim is provided with a plurality of seats for the elastic tires, in the present instance two such seats, (denoted by 3 and 4, respectively.)

Intermediate of the seats 3 and 4 the guard-flange 5 projects outwardly a distance sufficient to cause it to overlap the side of the rail 6, as is usual, to hold the wheel on the rail.

On the rim-seat 3 there is located an elastic tire 7, held in position by means of an annular keeper-ring 8, provided with a laterally-projecting skeleton flange 9, embedded in the tire 7, as shown, described, and claimed in the copending application of Romeo P. Tomassek, Serial No. 157,814, filed May 19, 1903.

In order to increase the elastic-tire bearing-surface for sustaining unusual weight, we locate an elastic tire 10 on the seat 4 on the inner side of the guard-flange 5. This tire 10 is locked in its position by a keeper-ring 11, provided with a laterally-projecting skeleton flange 12, embedded in the tire 10 in the manner shown, described, and claimed in the application above referred to.

The keeper-rings 8 and 11 are locked securely in position with respect to the rim of the wheel by means of bolts 13 extending through the two tires and through the intermediate annular flange 5, the said bolts being provided with nuts 14 for drawing the rings 8 and 11 toward each other to snugly press the tires 7 and 10 against the flange 5.

In using the additional elastic tire 10 the guard-stringer 15, such as is now common upon elevated railways, may be employed as a track and to this end may be provided with a thin metal cap or plate 16 to assist the cleaning of the upper surface of the track from ice and snow and to prevent the wood of which the stringer is commonly made from being worn, split, or splintered.

Along roads where the guard-stringer 15 is not at present located such a stringer may be laid without interfering with the traffic on the rail 6, and when laid the cars may be supplied with the wheels with their extended elastic tires utilizing both the rail 6 and the guard-stringers 16 as tracks for sustaining the loads transmitted thereto through the extended elastic tires.

In the above manner the undue compression of the elastic tire because of overweight may be avoided and the noise and wear and tear now incident to railway traffic may be materially lessened.

It is obvious that one of the elastic tires here shown—for example, the tire 7—might be made rigid, while the other tire, 10, might be made elastic, thus having the elastic tire supplement the action of the rigid tire or the rigid tire supplement the action of the elastic tire, if so desired.

What we claim is—

1. A car-wheel provided with a tread on the outer side of its guard-flange and an elastic tire forming a tread on the inner side of its guard-flange in combination with suitable rails on which the said treads bear.

2. A car-wheel provided with elastic tires located upon opposite sides of its guard-flange.

3. A car-wheel provided with elastic tires upon opposite sides of its guard-flange, keeper-rings located at the outer sides of the elastic tires and bolts extending through the guard-flange and through the keeper-rings for holding the tires in position.

4. The combination with a railway-rail and a stringer located inwardly and spaced from the said rail, of a car-wheel provided with a guard-flange adapted to travel along the space between the rail and the stringer and elastic tires on the car-wheel located upon opposite sides of the guard-flange and in position to engage respectively the rail and the stringer.

In testimony that we claim the foregoing as our invention we have signed our names, in presence of two witnesses, this 14th day of December, 1903.

ROMEO P. TOMASSEK.
ISIDORE H. SAMPERS.

Witnesses:
FREDK. HAYNES,
HENRY THIEME.